US007800768B2

(12) United States Patent
Yamada

(10) Patent No.: US 7,800,768 B2
(45) Date of Patent: Sep. 21, 2010

(54) PRINTING ASSIST SYSTEM, PRINTING ASSIST PROGRAM, AND PRINTING ASSIST METHOD

(75) Inventor: Satoshi Yamada, Suwa (JP)

(73) Assignee: Seiko Epson Corporation (JP)

( * ) Notice: Subject to any disclaimer, the term of this patent is extended or adjusted under 35 U.S.C. 154(b) by 1063 days.

(21) Appl. No.: 11/466,890

(22) Filed: Aug. 24, 2006

(65) Prior Publication Data

US 2007/0052992 A1 Mar. 8, 2007

(30) Foreign Application Priority Data

Sep. 7, 2005 (JP) ............................. 2005-258848

(51) Int. Cl.
*G06F 3/12* (2006.01)
*G06F 3/048* (2006.01)
*G06F 3/00* (2006.01)
*G06K 15/00* (2006.01)

(52) U.S. Cl. ..................... 358/1.13; 358/1.16; 715/811; 715/812; 715/810; 715/744; 715/745

(58) Field of Classification Search ............... 358/1.13, 358/1.15, 1.16; 715/745, 811, 812
See application file for complete search history.

(56) References Cited

U.S. PATENT DOCUMENTS

| 5,768,516 | A  | * | 6/1998  | Sugishima ................. 709/217 |
| 6,149,323 | A  | * | 11/2000 | Shima .......................... 400/76 |
| 6,348,971 | B2 | * | 2/2002  | Owa et al. ................. 358/1.15 |
| 6,631,008 | B2 | * | 10/2003 | Aoki ......................... 358/1.15 |
| 6,909,520 | B2 | * | 6/2005  | Ogino ....................... 358/1.15 |
| 7,046,383 | B1 | * | 5/2006  | Ueda et al. ................ 358/1.15 |
| 7,127,451 | B1 | * | 10/2006 | Kimura ......................... 707/3 |
| 7,143,210 | B2 | * | 11/2006 | Ferlitsch ....................... 710/38 |
| 7,339,686 | B1 | * | 3/2008  | Ward et al. ................. 358/1.13 |
| 2002/0060805 | A1 | * | 5/2002  | Tomita ....................... 358/1.15 |
| 2003/0120754 | A1 | * | 6/2003  | Muto et al. .................. 709/220 |
| 2005/0146731 | A1 | * | 7/2005  | Mitani ........................ 358/1.1 |
| 2006/0114497 | A1 | * | 6/2006  | Anderson et al. .......... 358/1.15 |
| 2006/0268318 | A1 | * | 11/2006 | Lofthus et al. ............. 358/1.15 |

FOREIGN PATENT DOCUMENTS

| JP | 2000-172469 | 6/2000 |
| JP | 2003-271330 | 9/2003 |
| JP | 2004-102613 | 4/2004 |
| JP | 2005-044300 | 2/2005 |

\* cited by examiner

*Primary Examiner*—King Y Poon
*Assistant Examiner*—Vincent R Peren
(74) *Attorney, Agent, or Firm*—Harness, Dickey & Pierce, P.L.C.

(57) ABSTRACT

A printing assist system including a print mode storage storing a plurality of print modes each including a specification of a printed material and a setting of a printing device, means for acquiring print specification information, means for acquiring printing device capability information, means for retrieving a plurality of print modes based on the acquired print specification information and the acquired printing device information, means for calculating, for each of the print modes retrieved by the print mode retrieving means and for each of a plurality of evaluation items, an evaluation value relative to other print modes, a selection history storage that stores a history of print mode selection by a user and includes the evaluation value of the present print mode for each evaluation item, and means for offering the plurality of retrieved print modes based on the selection history information and the evaluation values.

5 Claims, 11 Drawing Sheets

| RULE ID | SPECIFICATION PAPER SIZE | INSTALLED PAPER SIZE | POST-TREATMENT |
|---|---|---|---|
| 0 | A4 | A4 | *** |
| 11 | A4 | A3 | *** |
| 25 | A4 | A2 | *** |

| PRINTER ID | INSTALLED PAPER SIZE | PRINT SPEED [SHEETS/SECOND] | INK COST [YEN/SHEET] | IMAGE QUALITY |
|---|---|---|---|---|
| printer00 | A4, A3, A2 | 22, 30, 60 | 15, 30, 60 | 5 |
| printer01 | A4, A3 | 5, 10 | 10, 20 | 3 |
| printer02 | A4 | 10 | 10 | 3 |
| | | | | |

FIG. 5

| SELECTION HISTORY ID | USER ID | DEVIATION VALUE OF PRINT SPEED | DEVIATION VALUE OF PRINTING COST | DEVIATION VALUE OF IMAGE QUALITY |
|---|---|---|---|---|
| 0 | A | 57.61654 | 48.78155 | 49.01293 |
| 1 | A | 60.4559 | 50.10202 | 52.83085 |
| 2 | B | 44.88328 | 55.02317 | 45.9426 |
| 3 | A | 62.88394 | 53.03485 | 33.84998 |
| 4 | B | 50.75605 | 63.40295 | 53.19702 |
| 5 | A | 58.7854 | 55.69711 | 51.90976 |
| 6 | B | 56.44701 | 63.44599 | 36.26265 |
| 7 | A | 64.39076 | 59.97278 | 40 |

FIG. 6

| PAPER SIZE | PAPER COST [YEN/SHEET] |
|---|---|
| A4 | 5 |
| A3 | 10 |
| A2 | 22 |

FIG. 7

| SPECIFICATION NUMBER OF SHEETS OF PAPER | SPECIFICATION PAPER SIZE | PRINTER ID | RULE ID | INSTALLED PAPER SIZE | POST-TREATMENT |
|---|---|---|---|---|---|
| 19 | A4 | printer00 | 0 | A4 | * * * |
| 19 | A4 | printer01 | 0 | A4 | * * * |
| 19 | A4 | printer02 | 0 | A4 | * * * |
| 19 | A4 | printer00 | 11 | A3 | * * * |
| 19 | A4 | printer01 | 11 | A3 | * * * |
| 19 | A4 | printer00 | 25 | A2 | * * * |

| PRINTER ID | RULE ID | NECESSARY NUMBER OF SHEETS OF PAPER | PRINT TIME | INK COST | PAPER COST | PRINTING COST | IMAGE QUALITY |
|---|---|---|---|---|---|---|---|
| printer00 | 0 | 10 | 418 | 285 | 50 | 335 | 5 |
| printer01 | 0 | 10 | 95 | 190 | 50 | 240 | 3 |
| printer02 | 0 | 10 | 190 | 190 | 50 | 240 | 3 |
| printer00 | 11 | 5 | 300 | 285 | 50 | 335 | 5 |
| printer01 | 11 | 5 | 100 | 190 | 50 | 240 | 3 |
| printer00 | 25 | 3 | 360 | 285 | 66 | 351 | 3 |

FIG.10

| PRINTER ID | RULE ID | PRINT SPEED | DEVIATION VALUE | PRINTING COST | DEVIATION VALUE | IMAGE QUALITY | DEVIATION VALUE |
|---|---|---|---|---|---|---|---|
| printer00 | 0 | 0.227273 | 40.05939 | 0.716418 | 40.76455 | 1 | 60 |
| printer01 | 0 | 1 | 64.39076 | 1 | 59.97278 | 0.6 | 40 |
| printer02 | 0 | 0.5 | 48.64693 | 1 | 59.97278 | 0.6 | 40 |
| printer00 | 11 | 0.316667 | 42.8742 | 0.716418 | 40.76455 | 1 | 60 |
| printer01 | 11 | 0.95 | 62.81638 | 1 | 59.97278 | 0.6 | 40 |
| printer00 | 25 | 0.263889 | 41.21234 | 0.683761 | 38.55255 | 1 | 60 |

| ID | PRINT SPEED | DEVIATION VALUE | PRINTING COST | DEVIATION VALUE | IMAGE QUALITY | DEVIATION VALUE |
|---|---|---|---|---|---|---|
| 0 | 0.42 | 43.44 | 0.33 | 41.91 | 0.96 | 61.32 |
| 1 | 0.35 | 40.82 | 1.00 | 70.15 | 0.60 | 35.36 |
| 2 | 0.66 | 52.44 | 0.64 | 54.97 | 0.89 | 56.28 |
| 3 | 0.94 | 62.93 | 0.27 | 39.38 | 0.81 | 50.50 |
| 4 | 0.46 | 44.94 | 0.40 | 44.86 | 0.72 | 44.01 |
| 5 | 0.91 | 61.80 | 0.56 | 51.60 | 0.82 | 51.23 |
| 6 | 1.00 | 65.18 | 0.67 | 56.24 | 0.69 | 41.85 |
| 7 | 0.27 | 37.82 | 0.53 | 50.34 | 0.94 | 59.88 |
| 8 | 0.67 | 52.81 | 0.69 | 57.08 | 1.00 | 64.21 |
| 9 | 0.27 | 37.82 | 0.13 | 33.48 | 0.60 | 35.36 |

```
<JOB TICKET> ~600
    <PRINT MODE> ~604
        <BOOKBINDING> ~608
612~<LAYOUT STYLE>A4 VERTICAL</LAYOUT STYLE>~614
616~<BINDING>LEFT BINDING</BINDING>~618
        </BOOKBINDING>~610
    </PRINT MODE>~606
</JOB TICKET>~602
```

PRINTING ASSIST SYSTEM, PRINTING ASSIST PROGRAM, AND PRINTING ASSIST METHOD

BACKGROUND

1. Technical Field

The invention relates to a system, a program, and a method each for assisting printing when performing booklet printing by a printing device, and particularly to a printing assist system, a printing assist program, and a printing assist method each capable of selecting a print mode suitable for a user's requirement even if no selection history in the case with the same print specification exists.

2. Related Art

When performing booklet printing or making a job ticket therefor, a user needs to set finishing information such as a stitching position in detail besides format information such as a paper size, a printing direction, a page layout, and whether or not the double sided printing is performed. However, since in the case with the booklet printing, much jargon was used and there were too many items to be input, it was not necessarily easy for a user with little knowledge about the booklet printing to carry out the setting.

IN the past, techniques disclosed in, for example, JP-A-2003-271330, JP-A-2004-102613, JP-A-2000-172469, and JP-A-2005-44300, respectively, have been known to the public as techniques for assisting the booklet printing. Either of these techniques is for selecting a printing device or a printing setting suitable for the required specification of the printed material.

In the techniques disclosed in the documents listed above, if there are plural alternatives suitable for the required specification of the printed material, the user needs to further select what is suited to his or her own demand among the alternatives. For example, if the specification of the printed material includes only the paper size of A4, many alternatives may be retrieved. Therefore, in this case, the user refines the alternatives based on evaluation items such as cost, print speed, or image quality.

However, in the case in which a number of alternatives are retrieved, since which evaluation items the user gives greater importance to is not known, it is quite difficult to offer the alternatives based on consideration of the evaluation items to which the used gives greater importance. For example, if it is known that the user gives greater importance to cost, the alternative with low cost is preferably offered with priority.

Further, although the alternatives are refined based on the selection history of the user in the technique described in JP-A-2005-44300, if there is no selection history in the case with the same printed material specification, it is quite difficult to offer the alternatives based on consideration of the evaluation items to which the used gives greater importance.

SUMMARY

An advantage of providing a printing assist system, a printing assist program, and a printing assist method each capable of selecting a print mode suitable for the user's requirement even if no selection history in the case with the same printed material specification is present.

A printing assist system according to a first aspect of the invention is a printing assist system for assisting printing based on print specification information including a specification of printed material, and includes a print mode storage that stores a plurality of print modes each including the specification of the printed material and setting of a printing device, print specification information acquiring means for acquiring the print specification information, printing device information acquiring means for acquiring printing device information representing a device capability for each of a plurality of the printing devices, print mode retrieving means for retrieving a plurality of the print modes in the print mode storage based on the print specification information acquired by the print specification information acquiring means and the printing device information acquired by the printing device information acquiring means, evaluation calculation means for calculating, to each of the print modes retrieved by the print mode retrieving means and for each of a plurality of evaluation items, an evaluation value relative to other print modes, a selection history information storage that stores selection history information that is a history of selection of the print mode by a user and includes the evaluation value of the present print mode for each of the evaluation items, and print mode offering means for offering the plurality of print modes retrieved by the print mode retrieving means based on the selection history information in the selection history information storage and the evaluation values calculated by the evaluation value calculation means.

According this configuration, the print specification information is acquired by the print specification information acquiring means, the printing device information is acquired by the printing device information acquiring means, and a plurality of print modes are retrieved form the print mode storage by the print mode retrieving means based on the acquired print specification information and the acquired printing device information. And, the evaluation value calculation means calculates, to each of the retrieved print modes, the evaluation values relative to other print modes for each of the plurality of evaluation items, and the print mode offering means offers the plurality of retrieved print modes based on the selection history information in the selection history information storage and the calculated evaluation values.

Therefore, since the print modes are offered based on the selection history information including the evaluation values relative to other print modes and calculated for every evaluation item on the same occasion to the print modes, which have ever been selected by the user, even if no selection history in the case with the same specification of the printed matters exists, it can be estimated which evaluation item the user gives great importance to by comparing the evaluation values between the evaluation items in the selection history. Therefore, since the print modes can be offered taking the evaluation item to which the user give great importance into consideration, it becomes possible to advantageously select a printing device more appropriate to the demand of the user than before.

Here, the print specification information includes, for example, setting regarding imposition, folding style of the print medium, or setting regarding cutting or binding style. The same applies to the printing assist system according to a sixth aspect of the invention, a printing assist program according to an eighth or a thirteenth aspect of the invention, or a printing assist method according to a fifteenth or a twentieth aspect of the invention.

Further, as the evaluation values relative to other print modes, for example, order, difference, dispersion, standard deviation, deviation value, and other variation are included. The same applies to the printing assist system according to a sixth aspect of the invention, a printing assist program according to an eighth or a thirteenth aspect of the invention, or a printing assist method according to a fifteenth or a twentieth aspect of the invention.

Further, the print specification information acquiring means can take any configurations providing it can acquire the print specification information. For example, the print specification information can be input from an input device or the like, the print specification information can be acquired or received from an external device or the like, or the print specification information can be readout from a storage device or a storage medium. Therefore, acquiring includes at least inputting, getting, receiving, and reading. The same applies to the printing device information acquiring means or other concept of acquiring.

Further, the print mode storage is for storing the print modes by any measures and any time periods, and can be what previously stores the print modes, or can be configured to store the print modes on startup of the present system by inputting from the outside without storing previously. The same applies to the case of the selection history information storage when storing the selection history information. The same applies to the printing assist system according to the sixth aspect of the invention.

Further, the present system can be realized as a single device, a single terminal, or other single equipment, or a network system including plural devices, plural terminals, or plural equipment connected to each other and capable communicating with each other. In the latter case, each component can belong to either of the plural devices, plural terminals, or plural equipment, providing they are connected to each other so as to communicate with each other. The same applies to the printing assist system according to the sixth aspect of the invention.

Further, the printing assist system a second aspect of the invention, which is according to the first aspect of the invention, further includes evaluation item estimation means for estimating an evaluation item to which the user gives the greatest importance among the plurality of the evaluation items based on the selection history information in the selection history information storage, and the print mode offering means offers the print modes based on the evaluation values calculated by the evaluation value calculation means and the evaluation item estimated by the evaluation item estimation means.

According to this configuration, the evaluation item to which the user gives the greatest importance is estimated by the evaluation item estimation means from the plurality of evaluation items based on the selection history information in the selection history information storage, and the print modes are offered by the print mode offering means based on the calculated evaluation values and the estimated evaluation item.

Thus, the print modes can advantageously be offered taking the evaluation item to which the user gives the greatest importance into consideration.

Further, in the printing assist system according to the first or the second aspect of the invention, in the printing assist system according to a third aspect of the invention, the evaluation values are deviation values of the print mode to be evaluated in the plurality of print modes retrieved by the print mode retrieving means.

According to this configuration, it advantageously becomes easy to understand the extent of the importance given to a certain evaluation item compared to other evaluation items.

Further, in the printing assist system according to the first through the third aspect of the invention, the printing assist system according to a fourth aspect of the invention further includes print mode selection means for inputting the print mode that the user selects from the plurality of print modes offered by the print mode offering means, and output means for performing output based on the print mode selected in the print mode selection means.

According to this configuration, when the user selects either one of the offered plural print modes, the print mode selection means inputs the print mode selected by the user, and the output means performs output operation based on the selected print mode.

It should be noted here that the output includes, for example, creating the print data and transmitting the print data to the printer, creating the job ticket, and directly performing printing. The same applies to the printing assist system according to a seventh aspect of the invention, a printing assist program according to an eleventh or a fourteenth aspect of the invention, or a printing assist method according to an eighteenth or a twenty-first aspect of the invention.

Further, in the printing assist system according to the first through the third aspect of the invention, the printing assist system according to a fifth aspect of the invention further includes print mode selection means for inputting the print mode that the user selects from the plurality of print modes offered by the print mode offering means, and selection history information registration means for registering the selection history information in the selection history information storage based on the print mode selected in the print mode selection means and evaluation values calculated by the evaluation value calculation means.

According to this configuration, when the user selects either one of the offered plural print modes, the print mode selection means inputs the print mode selected by the user, and the selection history information registration means registers the selection history information in the selection history information storage based on the selected print mode and the calculated evaluation values.

Further, a printing assist system according to a sixth aspect of the invention is a printing assist system for assisting printing based on print specification information including a specification of printed material, and includes a print mode storage that stores a plurality of print modes each including the specification of the printed material and setting of a printing device, print specification information acquiring means for acquiring the print specification information, printing device information acquiring means for acquiring printing device information representing a device capability for each of a plurality of the printing devices, print mode retrieving means for retrieving a plurality of the print modes in the print mode storage based on the print specification information acquired by the print specification information acquiring means and the printing device information acquired by the printing device information acquiring means, evaluation calculation means for calculating, to each of the print modes retrieved by the print mode retrieving means and for each of a plurality of evaluation items, an evaluation value relative to other print modes, a selection history information storage that stores selection history information that is a history of selection of the print mode by a user and includes the evaluation value of the present print mode for each of the evaluation items, and print mode selection means for selecting either one of the plurality of print modes retrieved by the print mode retrieving means based on the selection history information in the selection history information storage and the evaluation values calculated by the evaluation value calculation means.

According this configuration, the print specification information is acquired by the print specification information acquiring means, the printing device information is acquired by the printing device information acquiring means, and a plurality of print modes are retrieved form the print mode storage by the print mode retrieving means based on the acquired print specification information and the acquired printing device information. And, the evaluation value calculation means calculates, to each of the retrieved print modes, the evaluation values relative to other print modes for each of the plurality of evaluation items, and the print mode selection means selects either one of the plurality of retrieved print modes based on the selection history information in the selection history information storage and the calculated evaluation values.

Therefore, since the print modes are offered based on the selection history information including the evaluation values relative to other print modes and calculated for every evaluation item on the same occasion to the print modes, which have ever been selected by the user, even if no selection history in the case with the same specification of the printed matters exists, it can be estimated which evaluation item the user gives great importance to by comparing the evaluation values between the evaluation items in the selection history. Thus, the print modes can advantageously be selected taking the evaluation item to which the user gives the greatest importance into consideration compared to the past.

Further, in the printing assist system according to the sixth aspect of the invention, the printing assist system according to a seventh aspect of the invention further includes output means for performing output based on the print mode selected in the print mode selection means.

According to this configuration, the output means performs output based on the selected print mode.

Meanwhile, in order for achieving the advantage described above, a printing assist program according to an eighth aspect of the invention is a printing assist program for assisting printing based on print specification information including a specification of printed material, including a program for instructing a computer to perform a process including the step of acquiring the print specification information, the step of acquiring printing device information representing a device capability for each of a plurality of the printing devices, the step of retrieving a plurality of the print modes in a print mode storage storing a plurality of the print modes including the specification of the printed material and setting of the printing device, based on the print specification information acquired in the step of acquiring print specification information and the printing device information acquired in the step of acquiring printing device information, the step of calculating, to each of the print modes retrieved in the step of retrieving the print modes and for each of a plurality of evaluation items, an evaluation value relative to other print modes, and the step of offering the plurality of print modes retrieved in the step or retrieving the print modes, based on the selection history information in a selection history information storage storing the selection history information that is a history of selection of the print mode by a user and includes the evaluation value of the print mode for each of the evaluation items and the evaluation values calculated in the step of calculating the evaluation values.

According to this configuration, when the program is loaded by a computer, and the computer performs the process according to the loaded program, the equivalent operation and advantage to the first aspect of the invention can be obtained.

Further, in the printing assist program according to the eighth aspect of the invention, the printing assist program according to a ninth aspect of the invention further includes a program for instructing the computer to perform the process further including the step of estimating an evaluation item to which the user gives the greatest importance among the plurality of the evaluation items based on the selection history information in the selection history information storage, and in the step of offering the print mode, the print modes are offered based on the evaluation values calculated in the step of calculating the evaluation values and the evaluation item estimated in the step of estimating evaluation item.

According to this configuration, when the program is loaded by a computer, and the computer performs the process according to the loaded program, the equivalent operation and advantage to the second aspect of the invention can be obtained.

Further, in the printing assist program according to the eighth or the ninth aspect of the invention, in the printing assist program according to a tenth aspect of the invention the evaluation values are deviation values of the print mode to be evaluated in the plurality of print modes retrieved in the step of retrieving the print modes.

According to this configuration, when the program is loaded by a computer, and the computer performs the process according to the loaded program, the equivalent operation and advantage to the third aspect of the invention can be obtained.

Further, in the printing assist program according to the eighth through the tenth aspect of the invention, the printing assist program according to an eleventh aspect of the invention further includes a program for instructing the computer to perform the process further including the step of inputting the print mode that the user selects from the plurality of print modes offered in the step of offering the print mode, and the step of performing output based on the print mode selected in the step of selecting the print mode.

According to this configuration, when the program is loaded by a computer, and the computer performs the process according to the loaded program, the equivalent operation and advantage to the fourth aspect of the invention can be obtained.

Further, in the printing assist program according to the eighth through the tenth aspect of the invention, the printing assist program according to a twelfth aspect of the invention further includes a program for instructing the computer to perform the process further including the step of inputting the print mode that the user selects from the plurality of print modes offered in the step of offering the print mode, and the step of registering the selection history information in the selection history information storage based on the print mode selected in the step of selecting the print mode and the evaluation values calculated in the step of calculating the evaluation values.

According to this configuration, when the program is loaded by a computer, and the computer performs the process according to the loaded program, the equivalent operation and advantage to the fifth aspect of the invention can be obtained.

Further, a printing assist program according to a thirteenth aspect of the invention is a printing assist program for assisting printing based on print specification information including a specification of printed material, including a program for instructing a computer to perform a process including the step of acquiring the print specification information, the step of acquiring printing device information representing a device capability for each of a plurality of the printing devices, the step of retrieving a plurality of the print modes in a print mode storage storing a plurality of the print modes including the specification of the printed material and setting of the printing device, based on the print specification information acquired in the step of acquiring print specification information and the printing device information acquired in the step of acquiring printing device information, the step of calculating, to each of the print modes retrieved in the step of retrieving the print modes and for each of a plurality of evaluation items, an evaluation value relative to other print modes, and the step of selecting either one of the plurality of print modes retrieved in the step of retrieving the print modes, based on the selection history information in a selection history information storage storing the selection history information that is a history of selection of the print mode by a user and includes the evaluation value of the print mode for each of the evaluation items and the evaluation values calculated in the step of calculating the evaluation values.

According to this configuration, when the program is loaded by a computer, and the computer performs the process according to the loaded program, the equivalent operation and advantage to the sixth aspect of the invention can be obtained.

Further, in the printing assist program according to the thirteenth aspect of the invention, the printing assist program according to a fourteenth aspect of the invention further includes a program for instructing the computer to perform the process further including the step of performing output based on the print mode selected in the step of selecting the print mode.

According to this configuration, when the program is loaded by a computer, and the computer performs the process according to the loaded program, the equivalent operation and advantage to the seventh aspect of the invention can be obtained.

Meanwhile, in order for achieving the advantage described above, a printing assist method according to a fifteenth aspect of the invention is a printing assist method for assisting printing based on print specification information including a specification of printed material including the step of acquiring the print specification information, the step of acquiring printing device information representing a device capability for each of a plurality of the printing devices, the step of retrieving a plurality of the print modes in a print mode storage storing a plurality of the print modes including the specification of the printed material and setting of the printing device, based on the print specification information acquired in the step of acquiring print specification information and the printing device information acquired in the step of acquiring printing device information, the step of calculating, to each of the print modes retrieved in the step of retrieving the print modes and for each of a plurality of evaluation items, an evaluation value relative to other print modes, and the step of offering the plurality of print modes retrieved in the step of retrieving the print modes, based on the selection history information in a selection history information storage storing the selection history information that is a history of selection of the print mode by a user and includes the evaluation value of the print mode for each of the evaluation items and the evaluation values calculated in the step of calculating the evaluation values.

Thus, the equivalent advantage to the printing assist system according to the first aspect of the invention can be obtained.

Further, in the printing assist method according to the fifteenth aspect of the invention, the printing assist method according to a sixteenth aspect of the invention further includes the step of estimating an evaluation item to which the user gives the greatest importance among the plurality of the evaluation items based on the selection history information in the selection history information storage, and in the step of offering the print mode, the print modes are offered based on the evaluation values calculated in the step of calculating the evaluation values and the evaluation item estimated in the step of estimating evaluation item.

Thus, the equivalent advantage to the printing assist system according to the second aspect of the invention can be obtained.

Further, in the printing assist method according to the fifteenth or the sixteenth aspect of the invention, in the printing assist method according to a seventeenth aspect of the invention the evaluation values are deviation values of the print mode to be evaluated in the plurality of print modes retrieved in the step of retrieving the print modes.

Thus, the equivalent advantage to the printing assist system according to the third aspect of the invention can be obtained.

Further, in the printing assist method according to the fifteenth through the seventeenth aspect of the invention, in the printing assist method according to an eighteenth aspect of the invention the step of inputting the print mode that the user selects from the plurality of print modes offered in the step of offering the print mode, and the step of performing output based on the print mode selected in the step of selecting the print mode.

Thus, the equivalent advantage to the printing assist system according to the fourth aspect of the invention can be obtained.

Further, in the printing assist method according to the fifteenth through the seventeenth aspect of the invention, the printing assist method according to a nineteenth aspect of the invention further including the step of inputting the print mode that the user selects from the plurality of print modes offered in the step of offering the print mode, and the step of registering the selection history information in the selection history information storage based on the print mode selected in the step of selecting the print mode and evaluation values calculated in the step of calculating the evaluation values.

Thus, the equivalent advantage to the printing assist system according to the fifth aspect of the invention can be obtained.

Further, a printing assist method according to a twentieth aspect of the invention is a printing assist method for assisting printing based on print specification information including a specification of printed material including the step of acquiring the print specification information, the step of acquiring printing device information representing a device capability for each of a plurality of the printing devices, the step of retrieving a plurality of the print modes in a print mode storage storing a plurality of the print modes including the specification of the printed material and setting of the printing device, based on the print specification information acquired in the step of acquiring print specification information and the printing device information acquired in the step of acquiring printing device information, the step of calculating, to each of the print modes retrieved in the step of retrieving the print modes and for each of a plurality of evaluation items, an evaluation value relative to other print modes, and the step of selecting either one of the plurality of print modes retrieved in the step of retrieving the print modes, based on the selection history information in a selection history information storage storing the selection history information that is a history of selection of the print mode by a user and includes the evaluation value of the print mode for each of the evaluation items and the evaluation values calculated in the step of calculating the evaluation values.

Thus, the equivalent advantage to the printing assist system according to the sixth aspect of the invention can be obtained.

Further, in the printing assist method according to the twentieth aspect of the invention, the printing assist method according to a twenty-first aspect of the invention further includes the step of performing output based on the print mode selected in the step of selecting the print mode.

Thus, the equivalent advantage to the printing assist system according to the seventh aspect of the invention can be obtained.

BRIEF DESCRIPTION OF THE DRAWINGS

The invention will now be described with reference to the accompanying drawings, wherein like numbers refer to like elements.

FIG. 5 is a diagram showing a data structure of a printer information registration table 420 according to an embodiment of the invention.

FIG. 6 is a diagram showing a data structure of a selection history information registration table 440 according to an embodiment of the invention.

FIG. 7 is a diagram showing a data structure of a paper cost registration table 460 according to an embodiment of the invention.

FIG. 10 is a diagram showing a data structure of an evaluation result registration table 500 registering evaluation results of the print modes, according to an embodiment of the invention.

FIG. 11 is a diagram showing a data structure of a deviation value registration table 520 registering normal evaluation values and deviation values of the print modes, according to an embodiment of the invention.

DESCRIPTION OF EXEMPLARY EMBODIMENTS

An embodiment of the invention will hereinafter be explained with reference to the accompanying drawings. FIGS. 1 through 17 are drawings for showing a printing assist system, a printing assist program, and a printing assist method as an embodiment according to the invention.

Firstly, a rough outline of a network system applying the embodiment of the invention will be explained.

Figure 1:
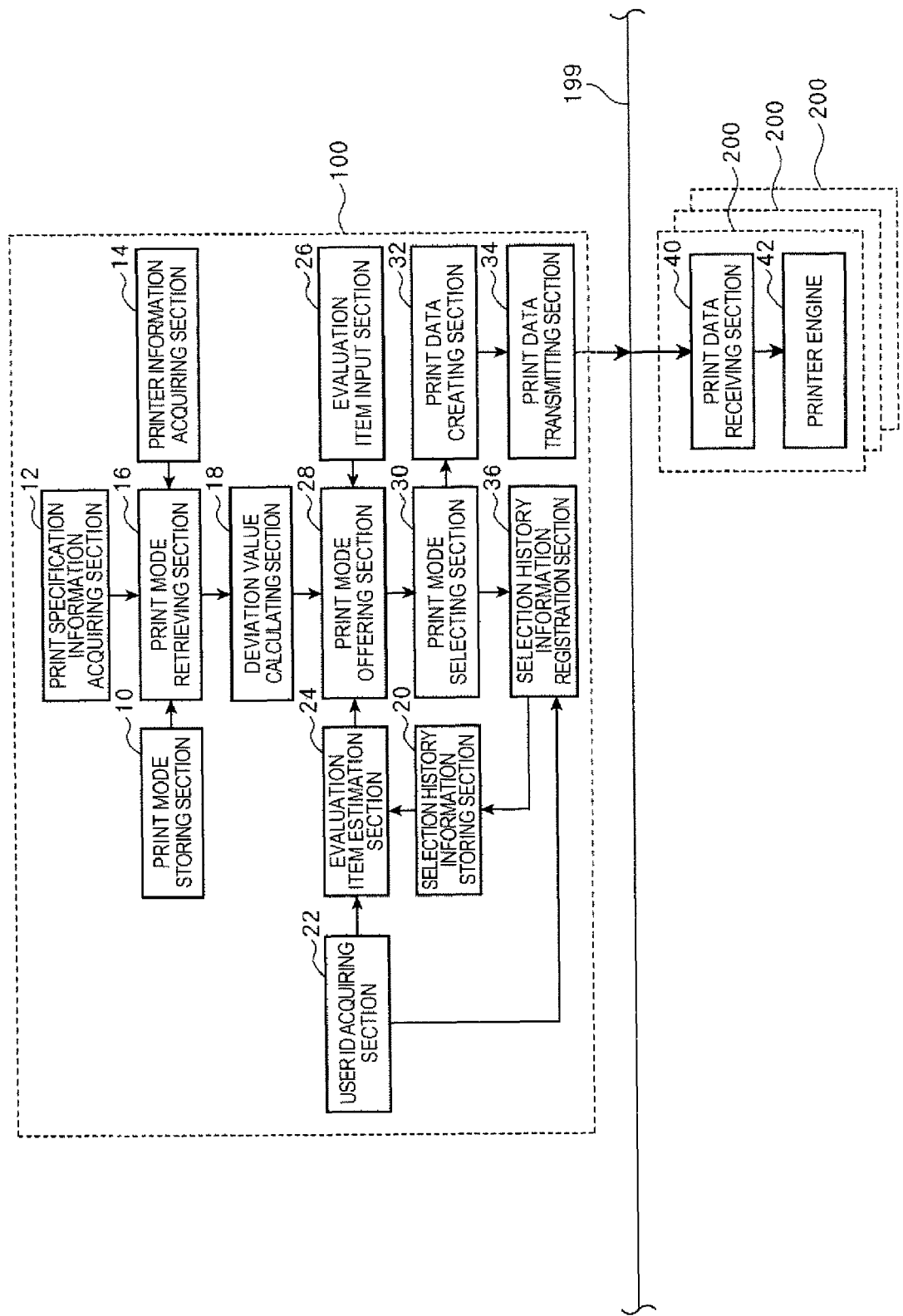
FIG. 1 is a functional block diagram showing a rough outline of the function of a network system according to an embodiment of the invention.

FIG. 1 is a functional block diagram showing the rough outline of the function of the network system.

As shown in FIG. 1, a host terminal 100 and a plurality of network printers 200 are connected to the network 199.

The host terminal 100 is configured including a print mode storing section 10 for storing a plurality of print modes each including a specification of a printed material and a printing setup of the network printer 200, a print specification information acquiring section 12 for acquiring print specification information, and a printer information acquiring section 14 for acquiring printer information representing equipment capacity.

The host terminal 100 is configured further including a print mode retrieving section 16 for retrieving a plurality of print modes from the print mode storing section 10 based on the print specification information acquired by the print specification information acquiring section 12 and the printer information acquired by the printer information acquiring section 14, and a deviation value calculating section 18 for calculating a deviation value for each of the plurality of evaluation items for each of the print modes retrieved by the print mode retrieving section 16.

The host terminal 100 is configured further including a selection history information storing section 20 for storing selection history information, which is a history of selection of a print mode by the user and includes the deviation values of the evaluation items of the print mode, correspondingly to the user ID, a user ID acquiring section 22 for acquiring the user ID, and an evaluation item estimation section 24 for estimating an evaluation item to which the user gives the greatest importance.

The evaluation item estimation section 24 acquires the selection history information corresponding to the user ID, which is acquired by the user ID acquiring section 22, from the selection history information storing section 20, and estimates the evaluation item to which the user gives the greatest importance from the plurality of evaluation items based on the selection history information thus acquired.

The host terminal 100 is configured further including an evaluation item inputting section 26 for inputting an evaluation item, a print mode offering section 28 for offering a plurality of print modes retrieved by the print mode retrieving section 16 based on the evaluation items estimated by the evaluation item estimation section 24 or the evaluation items input by the evaluation item inputting section 26 and the deviation values calculated by the deviation value calculating section 18, and a print mode selecting section 30 for inputting the print mode selected by the user among the plurality of print modes offered by the print mode offering section 28.

The host terminal 100 is configured further including a print data generating section 32 for generating print data based on the print mode selected by the print ode selecting section 30 and the document data, a print data transmitting section 34 for transmitting the print data generated by the print data generating section 32 to the network printer 200, and a selection history information registration section 36 for registering the selection history information in the selection history information storing section 20 based on the print mode selected by the print mode selecting section 30 and the deviation value calculated by the deviation value calculating section 18.

The network printer 200 is configured including a print data receiving section 40 for receiving the print data, and a printer engine 42 for performing printing based on the print data received by the print data receiving section 40.

The configuration of the host terminal 100 will now be explained.

Figures 2, 3:
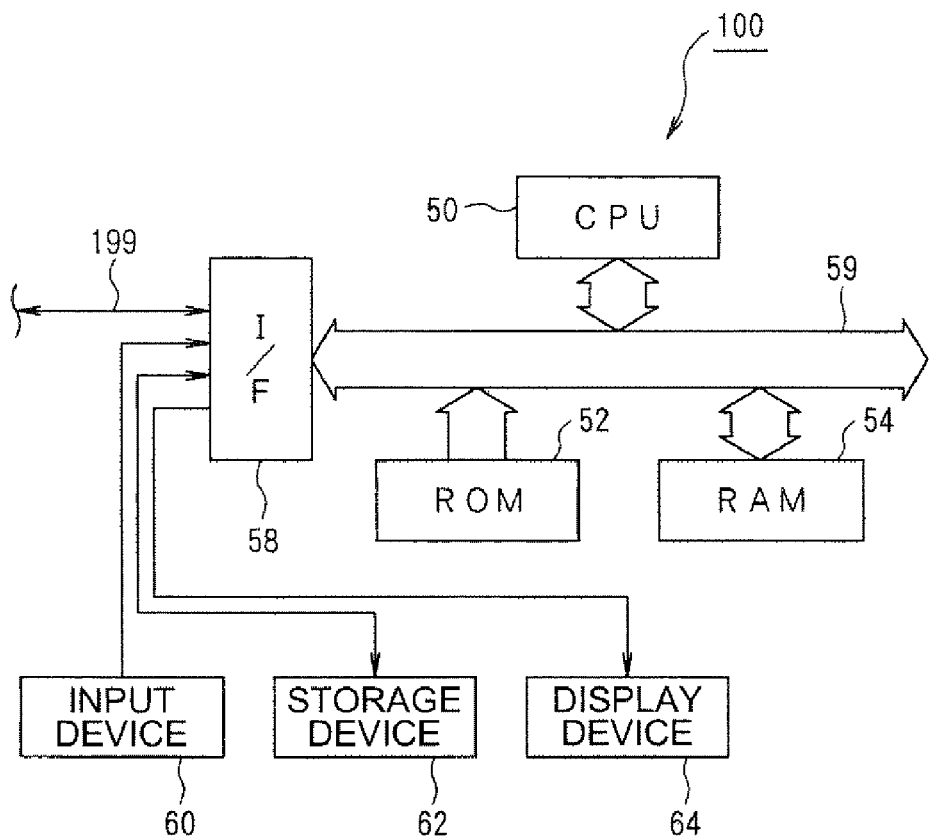
FIG. 2 is a block diagram showing a hardware configuration of a host terminal 100 according to an embodiment of the invention.
FIG. 3 is a diagram showing a data structure of a print mode registration table 400 according to an embodiment of the invention.

FIG. 2 is a block diagram showing the hardware configuration of the host terminal 100.

As shown in FIG. 2, the host terminal 100 is composed of a CPU 50 for performing operation and controlling the overall system in accordance with a control program, a ROM 52 for previously storing the control program for the CPU 50 in a predetermined area thereof, a RAM 54 for storing data read from the ROM 52 and so on or any necessary operation results in the operation procedure of the CPU 50, and an I/F 58 for mediating input/output of the data with an external device, and these elements are connected to each other with a bus 59 as a signal line for transferring data so as to transmit and receive data.

An input device 60 composed of a keyboard, a mouse, and so on capable of inputting data as a human interface, a storage device 62 for storing data and tables as files, a display device 64 for displaying screens based on image signals and signal lines for connecting to the network 199 are connected to the I/F 58 as external devices.

The storage device 62 stores a print mode registration table 400 registering a plurality of print modes.

FIG. 3 is a diagram showing a data structure of the print mode registration table 400.

As shown in FIG. 3, the print mode registration table 400 registers one record for every print mode. Each of the records is configured including fields for registering a rule ID for identifying the print mode, a paper size (hereinafter referred to as specification paper size) designated by the print specification information, a paper size (hereinafter referred to as installed paper size) the network printer 200 can cope with, and a posttreatment to be performed following the printing operation.

The posttreatment is a template defining a procedure of a typical operation such as imposition or a post-process.

Figure 4:
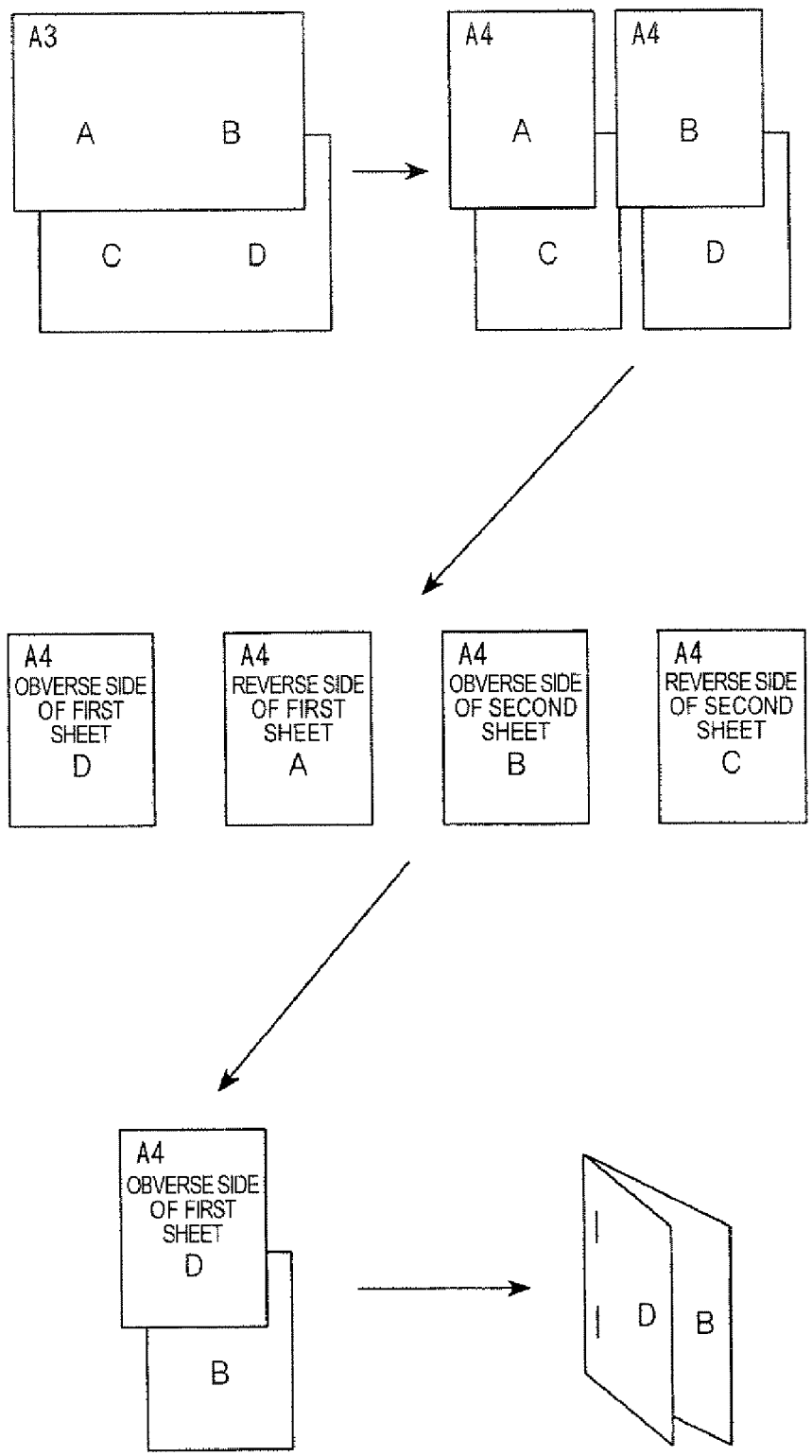
FIG. 4 is a diagram showing an example of an operation procedure according to an embodiment of the invention.

FIG. 4 is a diagram showing an example of the operation procedure.

In the example shown in FIG. 4, a printing procedure of dividing document data into A4 sized sheets, printing them with a layout of an A3 sized double-page spread, and binding them with a stapler is defined.

The storage device 62 stores the printer information registration table 420 registering the printer information.

FIG. 5 is a diagram showing a data structure of the printer information registration table 420.

As shown in FIG. 5, the printer information registration table 420 registers one record for every network printer 200. Each of the records is configured including fields for registering a printer ID for identifying the network printers 200, the installed paper size, a print speed, and ink cost of the network printer 200.

The storage device 62 stores the selection history information registration table 440 registering the selection history information.

FIG. 6 is a diagram showing a data structure of the selection history information registration table 440.

As shown in FIG. 6, the selection history information registration table 440 registers one record for every selection of the print mode. Each of the records is configured including fields for registering a selection history ID for identifying the selection history information, a user ID, a deviation value of the print speed of the selected print mode, a deviation value of the printing cost of the selected print mode, and a deviation value of the image quality of the selected print mode.

The storage device 62 stores a paper cost registration table 460 registering the paper cost.

FIG. 7 is a diagram showing a data structure of the paper cost registration table 460.

As shown in FIG. 7, the paper cost registration table 460 registers one record for every kind of paper. Each of the records is configured including fields for registering a paper size and the paper cost.

Figure 8:
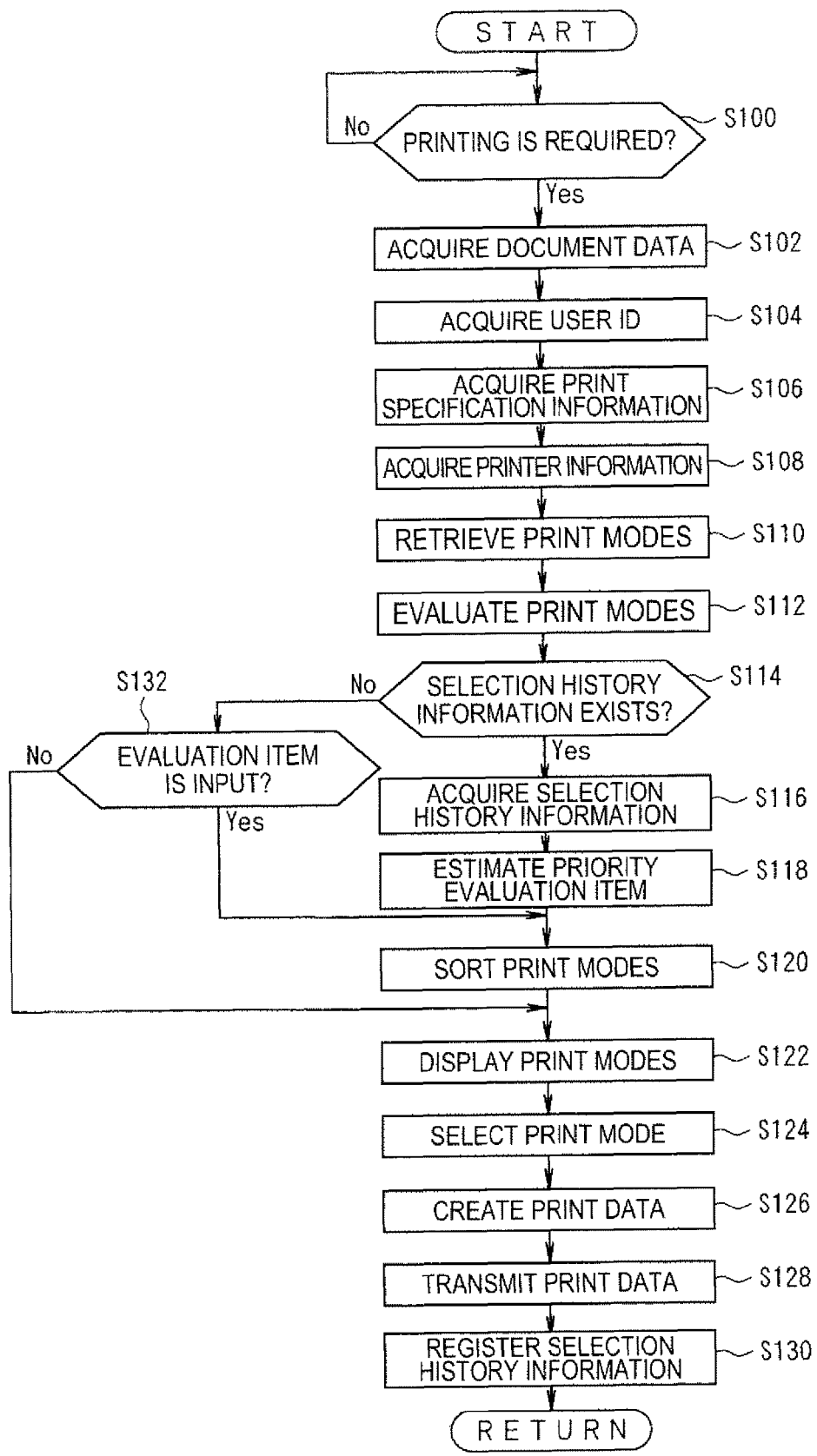
FIG. 8 is a flowchart showing a printing request process according to an embodiment of the invention.

Going back to FIG. 2, the CPU 50 is composed of a microprocessing unit and so on, runs a predetermined program stored in a predetermined area of the RON 52, and performs a printing request process shown in the flowchart of FIG. 8 in accordance with the program.

FIG. 8 is a flowchart showing the printing request process.

The printing request process is for requiring the network printer 200 to perform printing, and when the printing request process is performed by the CPU 50, the process moves to the step S100 as shown in FIG. 8.

In the step S100, whether or not printing is required by a document creation application or the like is judged, and if it is judged that the printing is required (Yes), the process moves to the step S102, and if it is judged otherwise (No), the process waits in the step S100 until the printing is required.

In the step S102, the document data is acquired from the document creation application or the like. And, after moving to the step S104, the user ID of the user requiring the printing is acquired. And, after moving to the step S106, the print specification information is acquired from the document data, and then the process moves to the step S108.

In the step S108, the printer information of each of the network printers 200 is acquired from the printer information registration table 420. And after moving to the step S110, the relevant print modes are retrieved from the print mode registration table 400 based on the acquired print specification information and the acquired printer information, and the process is moved to the step S112.

In the step S112, the deviation values are calculated regarding the three evaluation items, namely, print speed, printing cost, and image quality with respect to each of the print modes thus retrieved. Specifically, the deviation values are calculated by performing the following process.

Figure 9:
FIG. 9 is a diagram showing a data structure of an alternatives register table 480 registering the alternatives of the print mode correspondingly to a specification paper size and an installed paper size, according to an embodiment of the invention.

FIG. 9 is a diagram showing a data structure of an alternatives register table 480 registering the alternatives of the print mode correspondingly to a specification paper size and an installed paper size.

Firstly, the following operations are performed for every retrieved print mode, namely acquiring the number of pages (hereinafter referred to as specification number of pages) necessary for printing and the specification paper size from the print specification information, acquiring the installed paper size form the printer information, and registering the specification number of pages, the specification paper size, and the installed paper size thus acquired to the alternatives register table 480 correspondingly to each other.

FIG. 10 is a diagram showing a data structure of an evaluation result registration table 500 registering evaluation results of the print modes.

Subsequently, the following operations are performed for every retrieved print mode, namely, calculating the number of sheets of paper necessary for printing, the print time, the ink cost, the paper cost, the printing cost, and the image quality and registering them in the evaluation result registration table 500 correspondingly to each other.

First, regarding the necessary number of sheets of paper, whether or not the double sided printing is required is acquired from the print specification information, whether or not the double sided printing is possible is acquired from the printer information, thereby judging whether or the double sided printing will be performed, and the necessary number of sheets of paper is calculated based on the judgment result, the specification number of pages, the specification paper size, and the installed paper size. For example, if the specification number of pages is 19 pages and the specification paper size is A4, the necessary number of sheets of paper becomes ten in the case of the print mode with the installed paper size of A4, while in the case of the installed paper size of A3, the necessary number of sheets of paper becomes five, and in the case of the installed paper size of A2, the necessary number of sheets of paper becomes three.

Second, regarding the print time, it is calculated by dividing the number of print pages by the print speed acquired from the printer information. The number of print page is the as the necessary number of sheets of paper in the case of the single sided printing while in the case of the double sided printing, it becomes double the necessary number of sheets of paper.

Third, the ink cost is calculated by multiplying the number of print pages by the ink cost acquired from the printer information.

Fourth, the paper cost is calculated based on the installed paper size, the necessary number of sheets of paper, and the cost registration table 460.

Fifth, the printing cost is calculated by making addition of the ink cost and the paper cost.

Sixth, as the image quality, the image quality acquired from the printer information is directly used without modification.

FIG. 11 is a diagram showing a data structure of a deviation value registration table 520 registering normal evaluation values and deviation values.

Then, for every retrieved print mode, the print speed, the printing cost, and the image quality are normalized, and are registered to the deviation value registration table 520 correspondingly to the normalized values (hereinafter referred to as normal evaluation values). The normal evaluation value of the print speed is calculated by dividing the smallest value in the alternatives by the print speed of the present print mode, the normal evaluation value of the printing cost is calculated by dividing the smallest value in the alternatives by the printing cost of the present print mode, and the normal evaluation value of the image quality is calculated by dividing the image quality of the present print mode by the largest value in the alternatives.

And, for every retrieved print mode, deviation values are calculated base on the calculated normal evaluation values, and are registered in the deviation value registration table 520 correspondingly to the normal evaluation values. The deviation values are calculated based on the normal evaluation values of the alternatives and the normal evaluation value of the present print mode in the target evaluation item of the calculation of the deviation value. Specifically, they can be calculated using the following formula.

$$D=((Np-Na)/Sd) \times 10+50$$

Where D: Deviation value; Np: normal evaluation value of the present print mode; Na: average normal evaluation value; Sd: standard deviation.

Going back to FIG. 8, the process subsequently moves to the step S114 to judge whether or not the selection history information corresponding to the acquired user ID exists in the selection history information registration table 440, and if it is judged that the selection history information exists (Yes), it moves to the step S116 to acquire the selection history information corresponding to the acquired user ID from the selection history information registration table 440, and then it moves to the step S118.

In the step S118, which is the evaluation item (the priority evaluation item) the user gives the greatest importance to in the three evaluation items, namely the print speed, the printing cost, and the image quality, is estimated based on the acquired selection history information. If the number of pieces of the selection history information is one, the evaluation item with the highest deviation value in the evaluation items is estimated as the priority evaluation item. Further, if the number of pieces of the selection history information is plural, an average value of the deviation values is calculated for every evaluation item, and the evaluation item with the highest average value is estimated as the priority evaluation item.

Subsequently, the process moves to the step S120 to sort the retrieved print modes in descending order by the deviation value in the estimated priority evaluation item based on the deviation value registration table 520, and then it moves to the step S122 to display the retrieved print modes on the display device 64, and further moves to the step S124.

In the step S124 the user is prompted to select either one of the plural print modes displayed thereon, and the print mode selected by the user is input thereto. Then, the process moves to the step S126 to create print data based on the selected print mode and the acquired document data, and then moves to the step S128 to transmit the created print data to the network printer 200 together with the request for printing. After then, the process moves to the step S130.

In the step S130, the selection history information including the deviation values calculated for the selected print mode is registered to the selection history information registration table 440, and the process terminates the series of steps and returns to the original process.

On the contrary, if it is judged in the step S114 that no selection history information exists (No), the process moves to the step S132 to judge whether or not a priority evaluation item is input from the input device 60. And, if it is judged that a priority evaluation item is input (Yes), the process moves to the step S120. Thus, in the step S120, the retrieved print modes are sorted in descending order by the deviation value in the priority evaluation item thus input.

If it is judged in the step S132 that no priority evaluation item is input (No), the process moves to the step S122. Thus, in the step S122, the retrieved print modes are displayed as they are without being sorted.

The operation of the present embodiment will hereinafter be explained.

The user requests printing on the host terminal 100.

In the host terminal 100, when printing is requested, the document data, the user ID, the print specification information, and printer information are acquired through the steps S102 through S110, and a plurality of print modes are retrieved based on the print specification information and the printer information thus acquired. When the relevant print modes are retrieved as a result, the deviation values are calculated with respect to the three evaluation items, namely the print speed, the printing cost, and the image quality for every print mode thus retrieved through the step S112.

Subsequently, if any selection history information corresponding to the user ID exists, the relevant selection history information is acquired, and the priority evaluation item is estimated based on the acquired selection history information through the steps S116 and S118. And then, the print modes are sorted in descending order by the deviation value in the priority evaluation item base on the calculated deviation values, and the print modes thus sorted are displayed through the steps S120 and S122.

Figure 12:
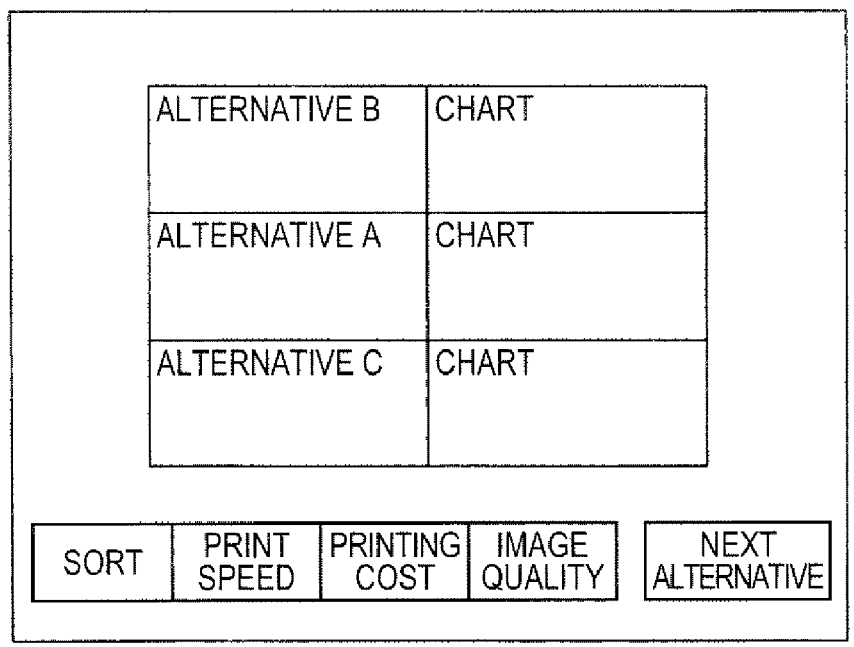
FIG. 12 is an example of a screen for selecting the print mode according to an embodiment of the invention.

FIG. 12 is an example of a screen for selecting the print mode.

In the selection screen shown in FIG. 12, three print modes with top three deviation values in the priority evaluation item are displayed in descending order. Further, the buttons respectively corresponding to the print speed, the printing cost, and the image quality are displayed as sort items, and when the user clicks one of the sort item buttons, the print modes are re-sorted in descending order by the deviation value in the item designated by the button. Further, a button for next alternatives is provided, and if the user clicks the next alternatives button, the fourth print mode or the later are displayed.

Further, a chart showing the normal evaluation value of each of the evaluation items is displayed with each of the print modes correspondingly thereto.

Figure 13:
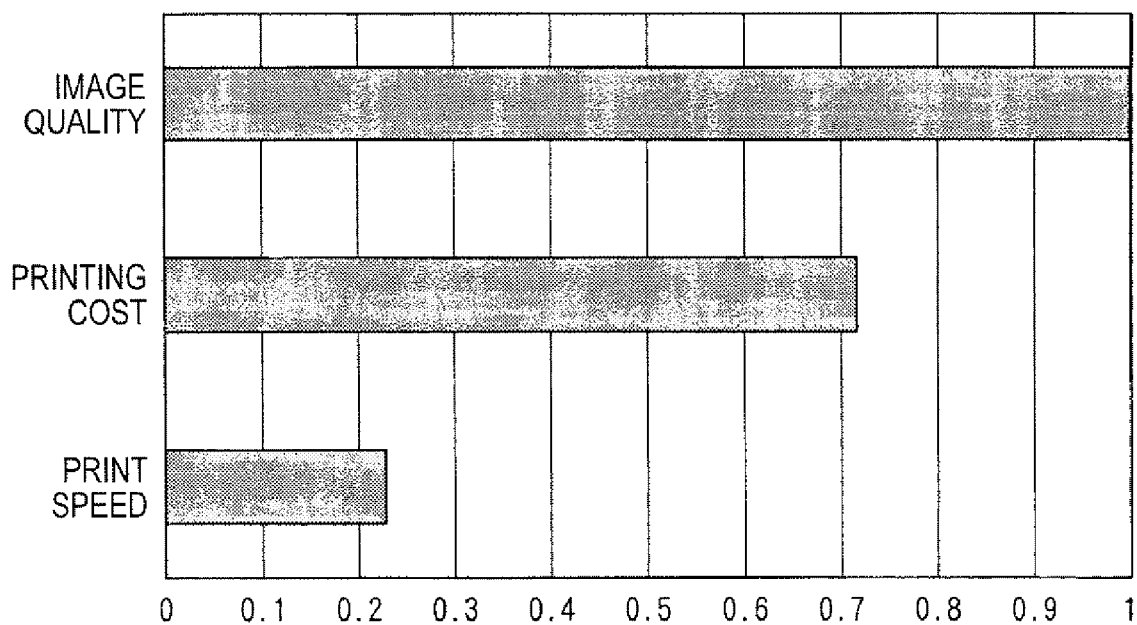
FIG. 13 is an example of a chart showing the normal evaluation values of the respective evaluation items according to an embodiment of the invention.

FIG. 13 is an example of the cart showing the normal evaluation values of the respective evaluation items.

Figures 14, 15:
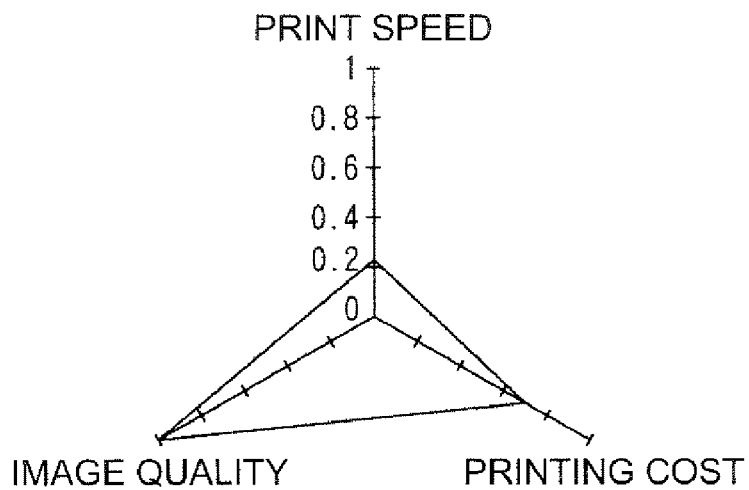
FIG. 14 is another example of a chart showing the normal evaluation values of the respective evaluation items according to an embodiment of the invention.
FIG. 15 is a diagram showing an example of the registration contents of the deviation value registration table 520 according to an embodiment of the invention.

FIG. 14 is another example of the chart showing the normal evaluation values of the respective evaluation items.

Each of the charts is displayed with a bar chart as shown in FIG. 13 or a radar chart as shown in FIG. 14.

When the user selects desired one of the print modes by, for example, referring the charts and clicking the print mode, the print data is created based on the selected print mode and the acquired document data, and the created print data is then transmitted to the network printer 200 through the steps S126 through S128.

In the network printer 200, when the print data is received by the print data receiving section 40, the printing is performed by the printer engine 42 based on the received print data.

It should be noted that the following advantages can be obtained by estimating the priority evaluation item using the deviation values instead of the normal evaluation values.

If the evaluation is performed using the normal evaluation values, a problem may occur in the case in which the distribution ranges of the normal evaluation values are different to each other.

FIG. 15 is a diagram showing an example of the registration contents of the deviation value registration table 520.

In the example shown in FIG. 15, each record registers the normal evaluation values and the deviation values regarding the print speed, the printing cost, and the image quality of one of the print modes (the ID in the diagram denotes an ID determined by (printer ID)×(rule ID)). In this example, it is assumed that the ten print modes ID0 through ID9 are retrieved.

Here, the normal evaluation values are distributed in ranges 0.27 through 1.00 in the print speed, 0.13 through 1.0 in the printing cost, and 0.60 through 1.00 in the image quality.

The priority evaluation item to which the user gives the greatest importance can be read from the normal evaluation values. For example, assuming that the user selects the print mode of ID6, it can be judged that the user gives greater importance to the print speed. It should be noted that this becomes possible because the normal evaluation values are created as a relative index having the maximum value of "1". If an absolute index is used, the maximum value has a certain range, and it becomes more difficult for the normal evaluation values to be used as the index of the priority evaluation item. (For example, if the maximum value of the print speed is 0.8, the maximum value of the printing cost is 0.5, and the maximum value of the image is 1.0, it is quite difficult to compare them on the same basis.)

Here, even if the priority evaluation item to which the user gives the greatest importance can be judged, regarding the priority evaluation item to which the user gives the next greatest importance, according to the normal evaluation values of the printing cost (0.67) and the image quality (0.69), it is mistakenly judged that the image quality is it. However, in fact, it is the eighth of all in the image quality while it is the third of all in the printing cost, and accordingly, it is conceivable that the result shows that the user gives greater importance to the printing cost than the image quality as the priority evaluation item.

In contrast, in the case of using the deviation values, since the values of the printing cost (56.24) and the image quality (41.85) are calculated considering comparison with other print modes, the printing cost is judged to be given greater importance in comparison with the image quality.

Judgment result with the normal evaluation values: print speed>image quality>printing cost Judgment result with the deviation values: print speed>printing cost>image quality Therefore, the result better corresponding to the actual conditions can be obtained with the deviation values.

As described above, the priority evaluation item can be estimated while reflecting "the result of comparison with other print modes" by using the deviation values. Further, the deviation values can be calculated if all of the normal evaluation values are recorded, but in this case, the amount of data to be recorded becomes large.

Thus, in the present embodiment, the host terminal 100 acquires the print specification information and the printer information, retrieves a plurality of print modes in the print mode registration table 400 based on the acquired print specification information and the printer information, calculates the deviation values of each of plural evaluation items for every retrieved print mode, and displays the retrieved plural print modes based on the selection history information and the calculated deviation values.

Therefore, since the print modes are displayed based on the selection history information including the deviation values calculated for every evaluation item on the same occasion to the print modes, which have ever been selected by the user, even if no selection history in the case with the same specification of the printed matters exists, it can be estimated which evaluation item the user gives great importance to by comparing the deviation values between the evaluation items in the selection history. Therefore, since the print modes can be displayed taking the evaluation item to which the user give great importance into consideration, it becomes possible to select a printing device more appropriate to the demand of the user than before.

Further, in the present embodiment, the host terminal 100 estimates the priority evaluation item to which the user gives great importance out of the plural evaluation items based on the selection history information, and displays the print modes based on the calculated deviation values and the estimated priority evaluation item.

Thus, the print modes can be displayed taking the evaluation item to which the user gives great importance into further consideration.

In the embodiment described above, the network printer 200 corresponds to the printing device according to the first, the sixth, the eighth, the thirteenth, the fifteenth, or the twentieth aspect, the print mode storing section 10 and the print mode registration table 400 correspond to the print mode storing means according to the first, the sixth, the eighth, the thirteenth, the fifteenth, or the twentieth aspect, and the selection history information storing section 20 and the selection history information registration table 440 correspond to the selection history information storing means according to the first, the second, the fifth, the sixth, the eighth, the ninth, the twelfth, the thirteenth, the fifteenth, the sixteenth, the nineteenth, or the twentieth aspect. Further, the print specification information acquiring section 12 and the step S106 correspond to the print specification information acquiring means according to the first or the sixth aspect, the step S106 corresponds to the step of acquiring print specification information according to the eighth, the thirteenth, the fifteenth, or the twentieth aspect, and the printer information acquiring section 14 and the step S108 correspond to the printing device information acquiring means according to the first or the sixth aspect.

Further, in the embodiment described above, the step S108 corresponds to the step of acquiring the printing device information according to the eighth, the thirteenth, the fifteenth, or the twentieth aspect, and the print mode retrieving section 16 and the step S110 correspond to the print mode retrieving means according to the first, the third, or the sixth aspect, and the step S110 corresponds to the step of retrieving the print mode according to the eighth, the tenth, the thirteenth, the fifteenth, the seventeenth, of the twentieth aspect. Further, the deviation value calculating section 18 and the step S112 correspond to the evaluation value calculation means according to the first, the second, the fifth, or the sixth aspect, the step S112 corresponds to the step of calculating the evaluation values according to the eighth, the ninth, the twelfth, the thirteenth, the fifteenth, the sixteenth, the nineteenth, or the twentieth aspect, and the evaluation item estimation section 24 and the step S118 correspond to the evaluation item estimation means according to the second aspect.

Further, in the embodiment described above, the step S118 corresponds to the step of estimating the evaluation item according to the ninth or the sixteenth aspect, and the print mode offering section 28 and the step S122 correspond to the print mode offering means according to the first, the second, the fourth, or the fifth aspect, and the step S122 corresponds to the step of offering the print mode according to the eighth, the ninth, the eleventh, the twelfth, the fifteenth, the sixteenth, the eighteenth, or the nineteenth aspect. Further, the print mode selecting section 30 and the step S124 correspond to the print mode selecting means according to any one of the fourth through the seventh aspect, the step S124 corresponds to the step of selecting the print mode according to any one of the eleventh through the fourteenth, or any one of the eighteenth through the twenty first aspect, and the selection history information registration section 36 and the step S130 correspond to the selection history information registering means according to the fifth aspect.

Further, in the embodiment described above, the step S130 corresponds to the step of registering the selection history information according to the twelfth or the nineteenth aspect, the print specification information corresponds to the print specification information according to the first, the sixth, the eighth, the thirteenth, the fifteenth, or the twentieth aspect, and the printer information corresponds to the printing device information according to the first, the sixth, the eighth, the thirteenth, the fifteenth, or the twentieth aspect.

It should be noted that, although in the embodiment described above, the print speed, the printing cost, and the image quality are used as the evaluation items, the evaluation items are not limited to those, but location of the network printer 200, environmental burden, type of the ink (e.g., environmentally-friendly ink) and type of the paper (e.g., recycled paper or not) can also be used as the evaluation items. In the case in which the location is used, firstly the position of the network printer 200 is stored included in the printer information, and the location of the user is stored included in the user information. And, the distance between the network printer 200 and the user is calculated based on the printer information and the user information to evaluate the size of the distance.

The normal evaluation value is calculated by dividing the smallest value among the alternatives by the distance in the present print mode.

Further, although in the embodiment described above, it is configured to estimate one priority evaluation item, this is not a limitation. It is also possible to be configured so as to estimate the evaluation items to which the user gives the second greatest or lower importance, and to sort the print modes by the evaluation items in the order of the importance given to the evaluation items. For example, in the case in which the importance of the print speed, the printing cost, and the image quality decreases in this order, the print modes are sorted in descending order by the print speed, and the records with the same deviation values in the print speed are further sorted in descending order by the printing cost, and the records with the same deviation values in the printing cost are further sorted in descending order by the image quality.

Further, although in the embodiment described above, it is configured to perform evaluation using the deviation values, this is not a limitation. And, a desired evaluation values can be adopted providing they are relative evaluation values to other print modes. For example, besides order, difference, dispersion, standard deviation, deviation value, and other variation, an evaluation value calculated by the following formula [1] can also be adopted.

$$Ev=(Ne-Mn)/(Mx-Nn) \quad [1]$$

Where Ev: evaluation value; Ne: normal evaluation value; Mn: minimum normal evaluation value; Mx: maximum normal evaluation value Further, although in the embodiment described above, as shown in FIG. 12, the same display configurations are used for the print modes, this is not a limitation. Different display configurations can be used in accordance with the deviation values in the priority evaluation item.

Figures 16, 17:
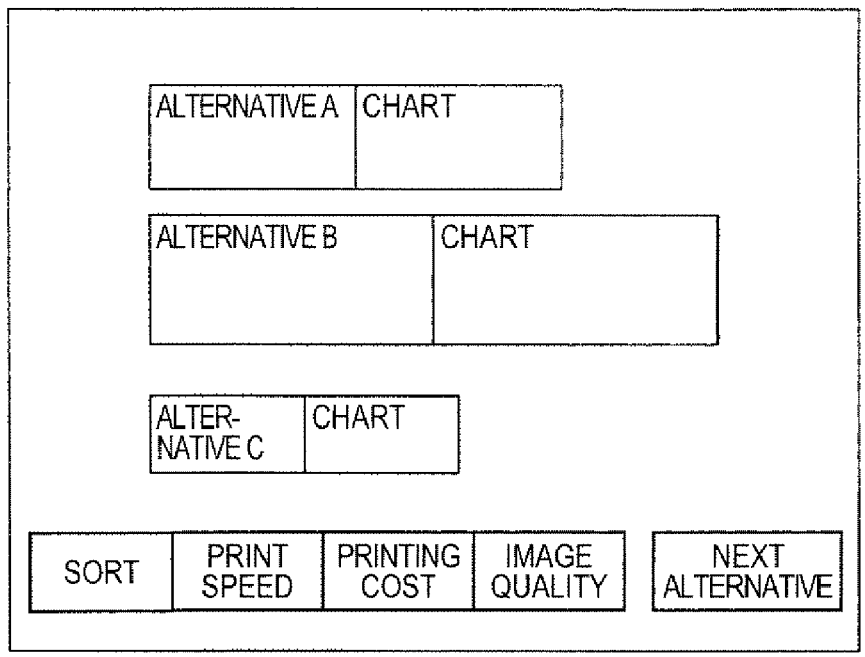
FIG. 16 is another example of the screen for selecting the print mode according to an embodiment of the invention.
FIG. 17 is a diagram showing a data structure of a job ticket according to an embodiment of the invention

FIG. 16 is another example of the screen for selecting the print mode.

In the example shown in FIG. 16, the size of the display area is changed in accordance with the deviation value in the priority evaluation item. The larger the deviation value is, the bigger the size of the display area becomes.

Further, although in the embodiment described above, it is configured that the print data is created based on the selected print mode and the document data, this is not a limitation, but the following two configurations can be proposed.

In the first configuration, the print mode is automatically selected from the retrieved print modes based on the calculated deviation values, and printing is required to the network printer 200 base on the selected print mode and the print data. In this case, for example, the print mode with highest deviation value in the priority evaluation item is selected.

In the second configuration, the print mode is automatically selected from the retrieved print modes based on the calculated deviation values, the job ticket is created based on the selected print mode, the print data is acquired, and the acquired print data and the created job ticket are transmitted to the network printer 200. Further, the configuration only for creating the job ticket can also be adopted.

FIG. 17 is a diagram showing a data structure of the job ticket.

As shown in FIG. 17, in the lob ticket, the required print mode is set by describing a tag set composed of a start tag and an end tag in a nested manner between a predetermined start tag 600 (e.g., <job ticket>) and an end tag 602 (e.g., </job ticket>). Between the tags of the tag set 600, 602, there is described a tag set 604, 606 for setting the print mode. Further, between the tags of the tag set 604, 606, there is described a tag set 608, 610 for setting the bookbinding style.

Between the tags of the tag set 608, 610, there is described "A4 vertical" with a tag set 612, 614 for setting the paper size and the print direction. This shows that the paper size is "A4," and the print direction is "vertical."

Further, between the tags of the tag set 608, 610, there is described "center binding" with a tag set 616, 618 for setting the binding position. This shows that the binding position is "center biding."

Further, although in the embodiment described above, it is configured that the printer information is acquired from the printer information registration table 420, this is not a limitation, but it can also be configured that the printer information is acquired from the network printer 200

Further, although in the embodiment described above, the host terminal 100 and the network printer 200 are configured separately from each other, this is not a limitation, but they can be configured as a stand-alone printer having these functions integrally, and can be configured to perform printing directly.

Further, although in the embodiment described above, the case in which the control program previously stored in the ROM 52 is executed for performing the print request process shown in the flowchart in FIG. 8 is explained, this is not a limitation, but the program can be executed after loading it in the RAM 54 from a storage medium storing the program instructing these procedure.

It should be noted here that the storage medium denotes a semiconductor storage medium such as RAM or ROM, a magnetic storage type of storage medium such as FD or HD, an optical readout type of storage medium such as CD, CDV, LD, DVD, a magnetic storage/optical readout type of storage medium such as MO, and includes all storage media regardless of the readout principle such as electrical, magnetic, or optical providing the storage medium is computer-readable.

The entire disclosure of Japanese Patent Application No. 2005-258848, filed Sep. 7, 2005 is expressly incorporated by reference herein.

What is claimed is:

1. A printing assist system for assisting printing based on print specification information including a specification of printed material, comprising:
   a print mode storage that stores a plurality of print modes each including the specification of the printed material and setting of a printing device;
   print specification information acquiring means for acquiring the print specification information;
   printing device information acquiring means for acquiring printing device information representing a device capability for each of a plurality of the printing devices;
   print mode retrieving means for retrieving a plurality of the print modes in the print mode storage based on the print specification information acquired by the print specification information acquiring means and the printing device information acquired by the printing device information acquiring means;
   evaluation calculation means for calculating, for each of the print modes retrieved by the print mode retrieving means, a plurality of evaluation items relative to other print modes, the plurality of evaluation items including a print speed deviation value, a printing cost deviation value, and an image quality deviation value;
   a selection history information storage that stores selection history information that is a history of selection of the print mode by a user and includes the print speed deviation value, the printing cost deviation value, and the image quality deviation value of the present print mode; and
   print mode offering means for offering the plurality of print modes retrieved by the print mode retrieving means based on the selection history information in the selection history information storage and the print speed deviation value, the printing cost deviation value, and the image quality deviation value calculated by the evaluation value calculation means for each print mode of the plurality of print modes retrieved by the print mode retrieving means.

2. The printing assist system according to claim 1, further comprising:
   evaluation item estimation means for estimating an evaluation item to which the user gives the greatest importance among the plurality of the evaluation items based on the selection history information in the selection history information storage,
   wherein the print mode offering means offers the print modes based on the print speed deviation value, the printing cost deviation value, and the image quality deviation value calculated by the evaluation value calculation means and the evaluation item estimated by the evaluation item estimation means.

3. The printing assist system according to claim 1, further comprising:
   print mode selection means for inputting the print mode that the user selects from the plurality of print modes offered by the print mode offering means; and
   output means for performing output based on the print mode selected in the print mode selection means.

4. The printing assist system according to claim 1, further comprising:
   print mode selection means for inputting the print mode that the user selects from the plurality of print modes offered by the print mode offering means; and
   selection history information registration means for registering the selection history information in the selection history information storage based on the print mode selected in the print mode selection means and the print speed deviation value, the printing cost deviation value, and the image quality deviation value calculated by the evaluation value calculation means.

5. A printing assist method for assisting printing based on print specification information including a specification of printed material, comprising:
   acquiring the print specification information;
   acquiring printing device information representing a device capability for each of a plurality of the printing devices;
   retrieving a plurality of the print modes in a print mode storage storing a plurality of the print modes including the specification of the printed material and setting of the printing device, based on the print specification information acquired in the step of acquiring print specification information and the printing device information acquired in the step of acquiring printing device information;
   calculating, for each of the print modes retrieved in the step of retrieving the print modes, a plurality of evaluation items relative to other print modes, the plurality of evaluation items including a print speed deviation value, a printing cost deviation value, and an image quality deviation value; and
   offering the plurality of print modes retrieved in the step of retrieving the print modes, based on the selection history information in a selection history information storage storing the selection history information that is a history of selection of the print mode by a user and includes the print speed deviation value, the printing cost deviation value, and the image quality deviation value for each of the plurality of print modes.

* * * * *